Feb. 23, 1960 V. O. ARMSTRONG 2,925,868
POWER TRANSMISSION AND CONTROLS FOR A HELICOPTER
Filed July 6, 1955 7 Sheets-Sheet 1
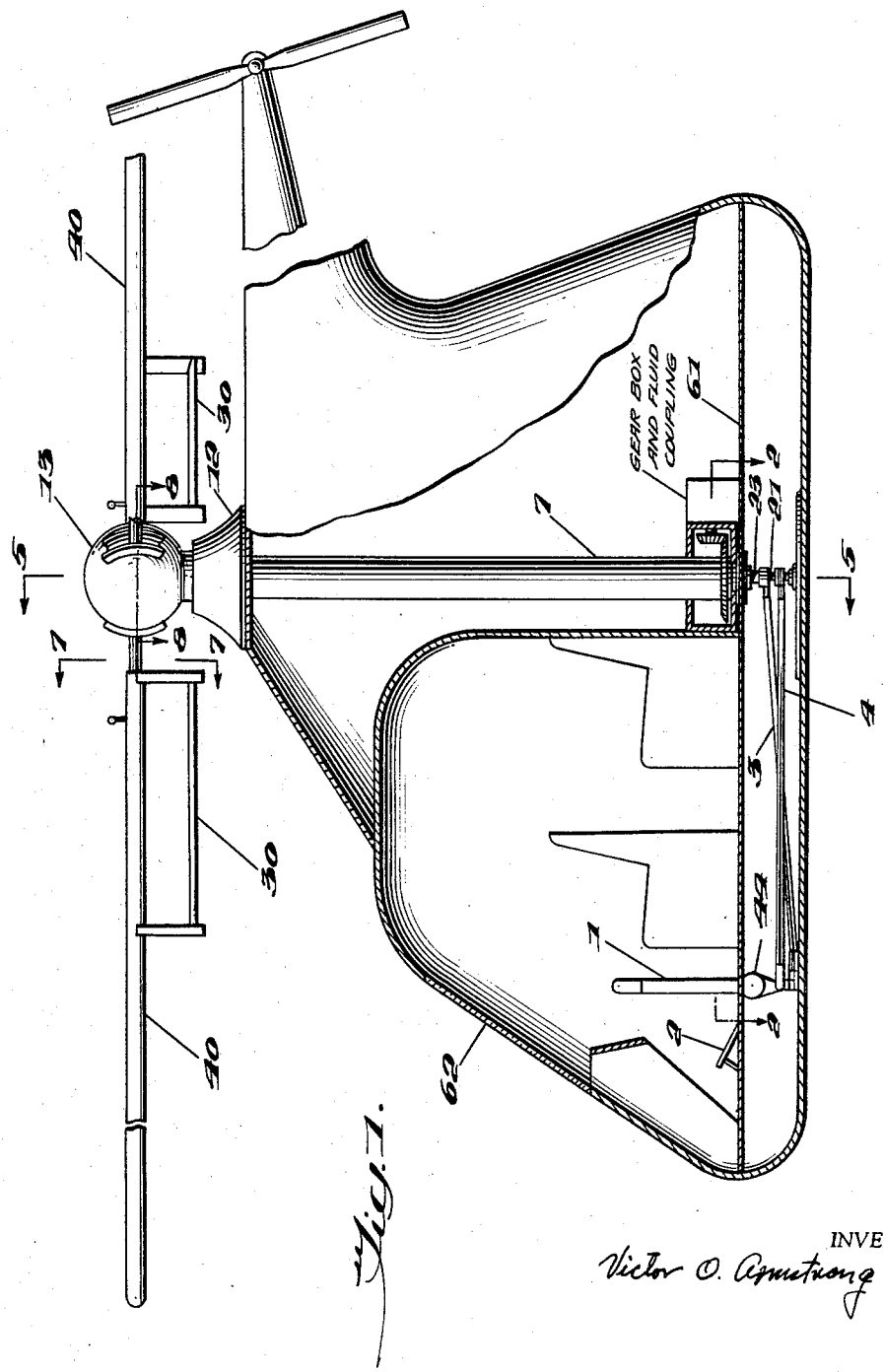
INVENTOR
Victor O. Armstrong

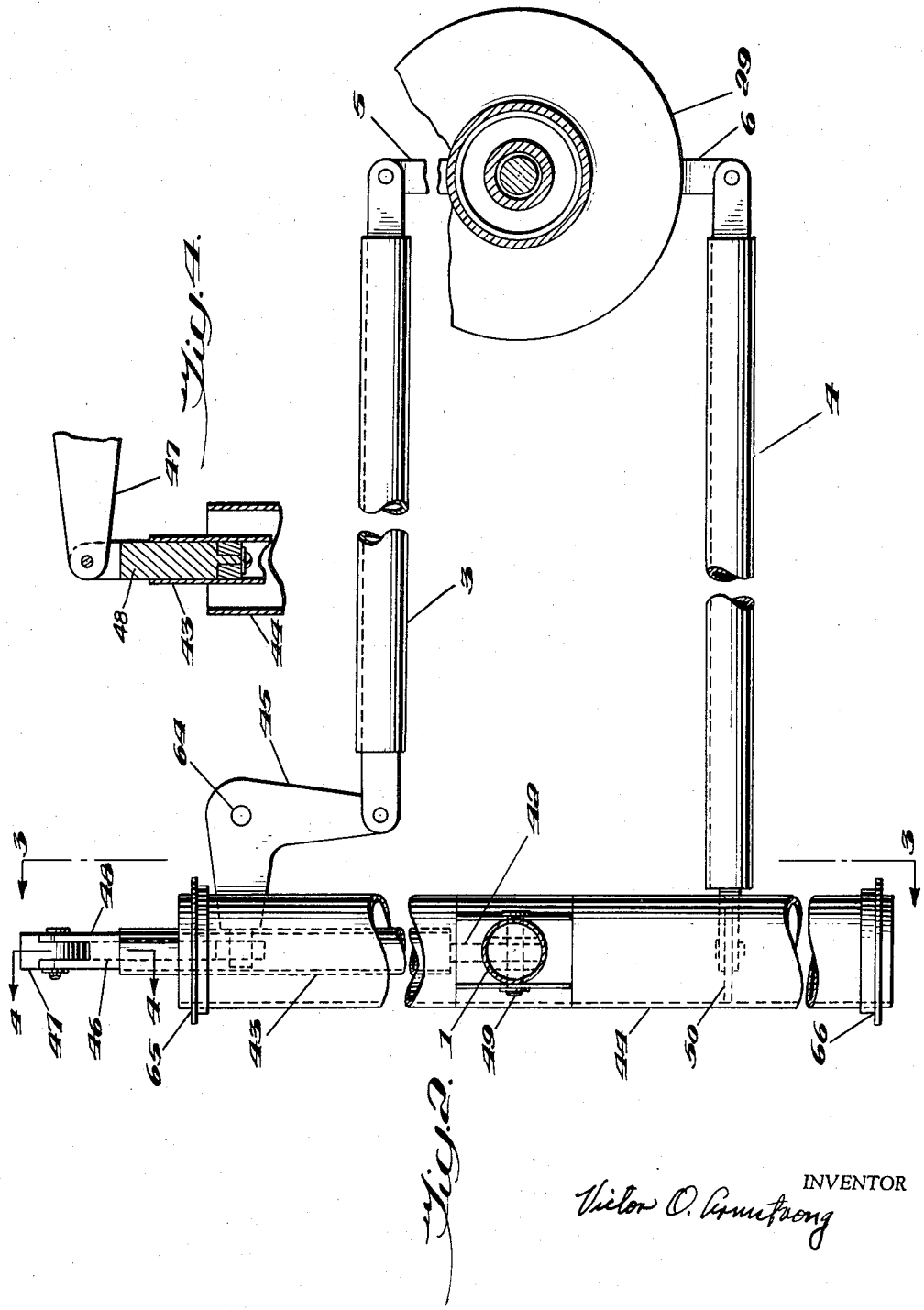

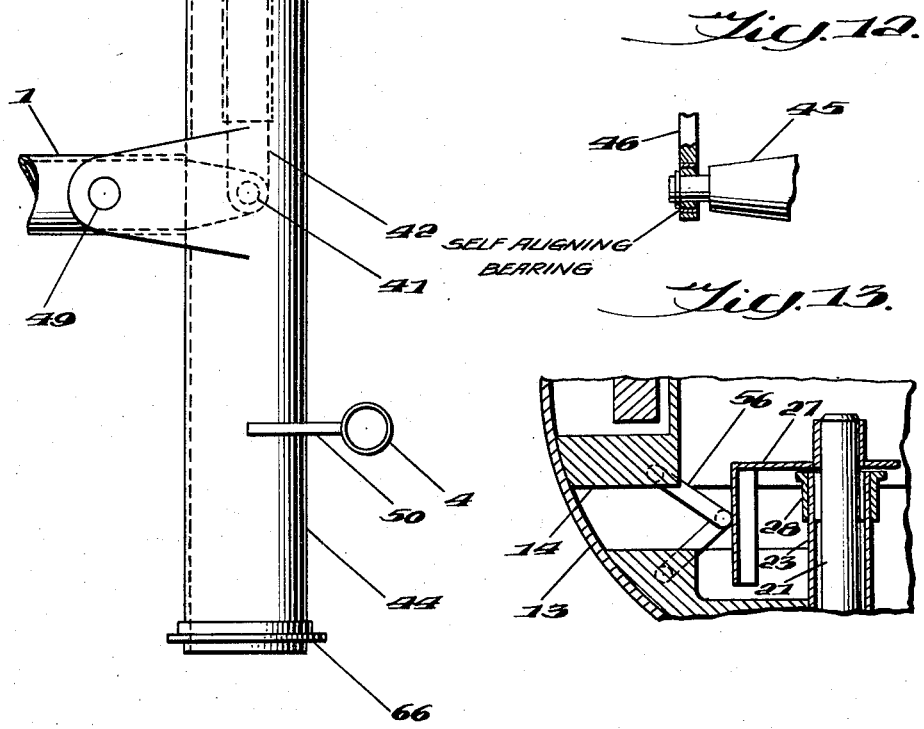

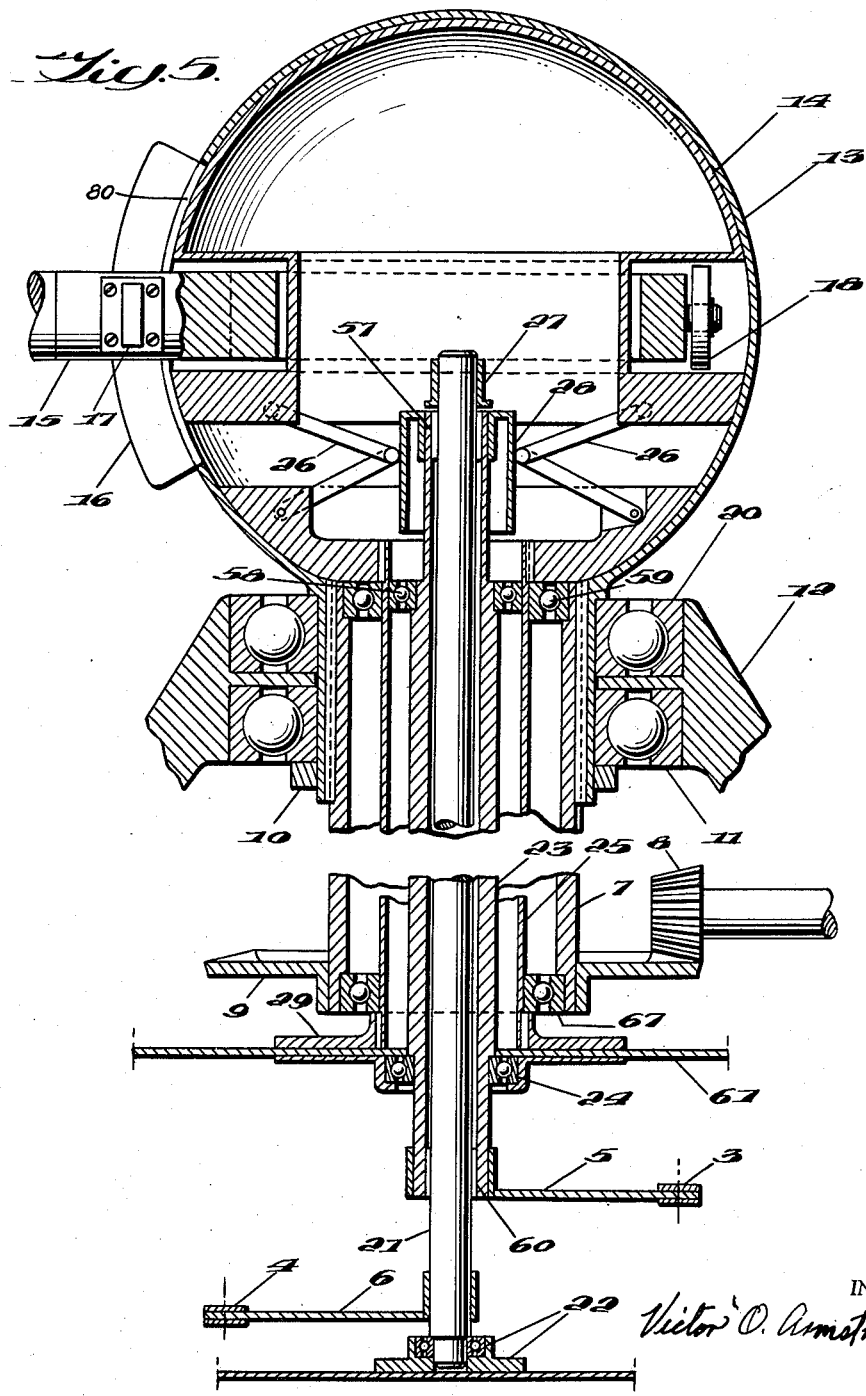

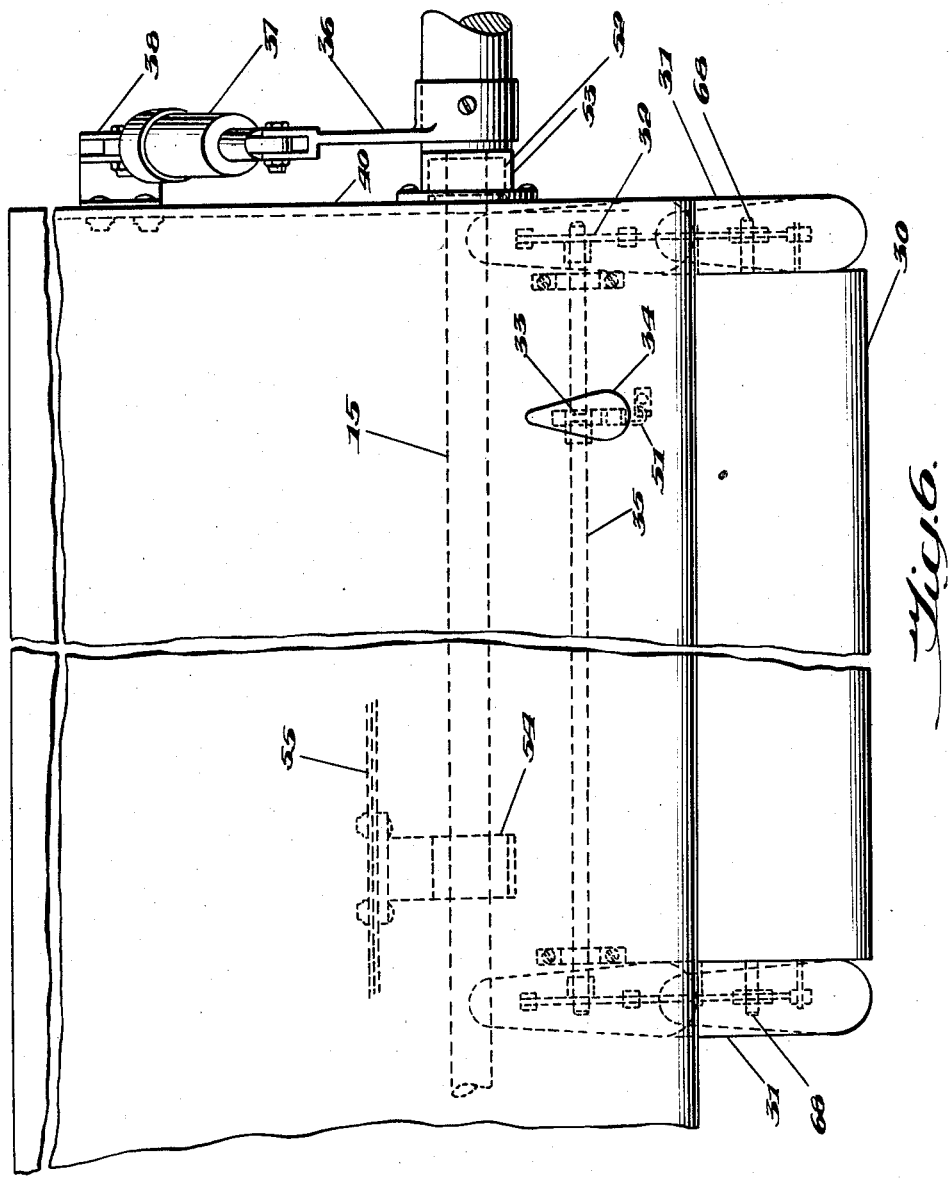

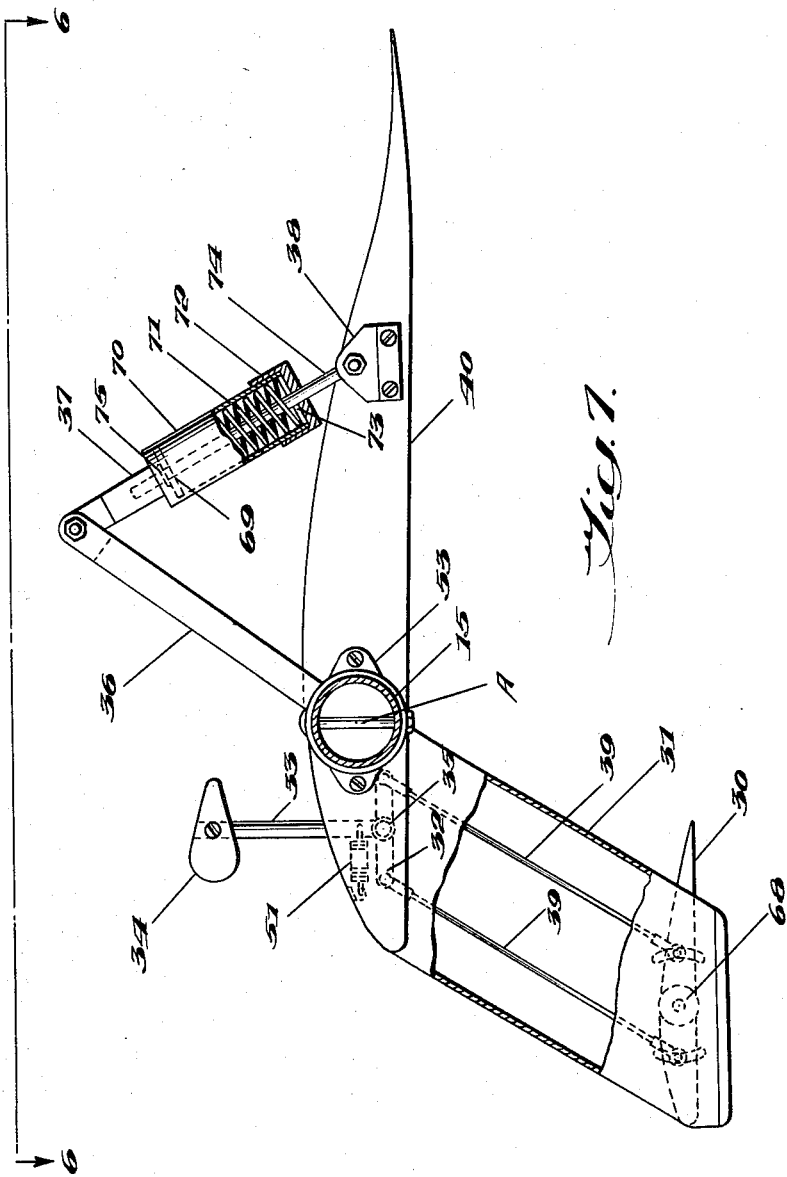

Feb. 23, 1960 V. O. ARMSTRONG 2,925,868
POWER TRANSMISSION AND CONTROLS FOR A HELICOPTER
Filed July 6, 1955 7 Sheets-Sheet 7
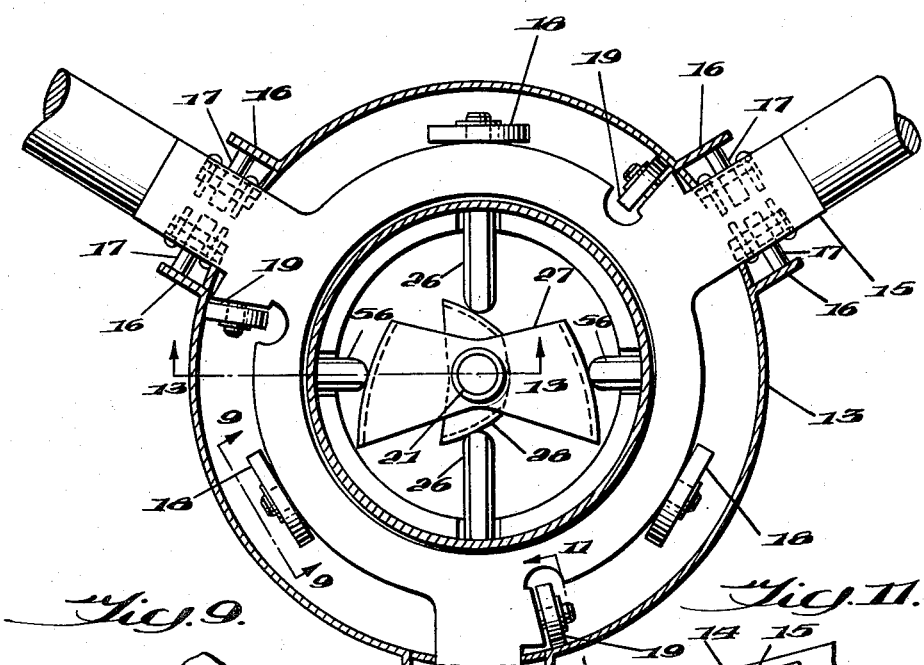
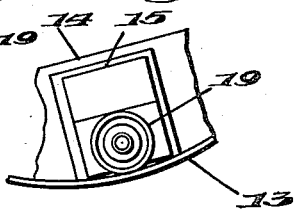
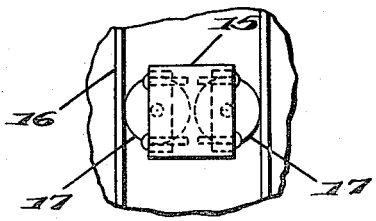
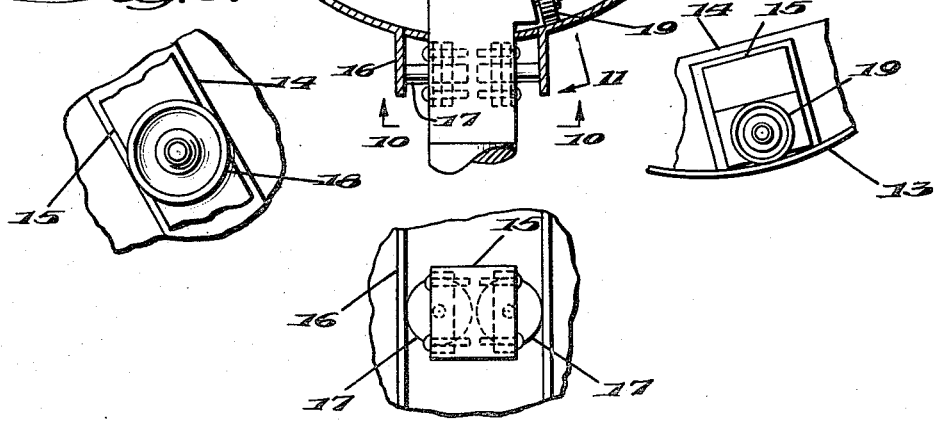
INVENTOR
Victor O. Armstrong

United States Patent Office 2,925,868
Patented Feb. 23, 1960

2,925,868

POWER TRANSMISSION AND CONTROLS FOR A HELICOPTER

Victor O. Armstrong, Pacoima, Calif.

Application July 6, 1955, Serial No. 520,335

11 Claims. (Cl. 170—160.27)

This invention relates to helicopters particularly to the power transmission and control of the direction of travel of a helicopter.

Previously designed helicopters have used a change in cyclic pitch on the rotor blades together with independent flapping hinges to control the lateral and longitudinal motion of the machine. The change in the direction of application of the lift vector was accomplished by the application of cyclic pitch control.

It is the object of this invention to change the direction of the application of the lift vector by tilting the plane of the rotor blades by means of cams located in the spherical head.

Another object of this invention is to show a unique method of control for a helicopter in which the primary controls are so simplified that all control except engine revolutions per minute are controlled by a stick.

Still another unique feature of this invention is the application of power through a shaft which is splined to a sphere. In this way no fixed connection exists between the power unit and the blade yoke.

Still another feature of this invention is the automatic control of the pitch on the rotor blades. This feature is so designed that in the event of power failure the blades automatically assume a negative angle of attack until sufficient rotor speed is built up to provide lift for the machine. This is an added safety factor.

These and other unique features will be apparent upon examining the accompanying drawing wherein:

Fig. 1 is a side elevation of the helicopter showing the relative location of the component parts.

Fig. 2 is a plan view of the control linkage from the stick to the lower end of the control shaft.

Fig. 3 is a view of the attachment of the stick to the torque shaft and to the side push-pull rod.

Fig. 4 is a view of a portion of the side control linkage.

Fig. 5 is a cutaway view of the power transmission and control mechanism.

Fig. 6 is a plan view of the automatic control mechanism for the blade angle of attack.

Fig. 7 is an end view of Fig. 6.

Fig. 8 is a plan view of Fig. 5 taken at the center of the sphere showing the location and relative position of the cams and the attaching linkages.

Fig. 9 is a view showing the location of bearing 18.

Fig. 10 is a view showing the installation of the blade yoke retaining bearings 17.

Fig. 11 is a view showing the location of the bearings which hold the blade yoke concentric with the center of the sphere.

Fig. 12 is a view showing the self aligning bearing installation in the control linkage.

Fig. 13 is a view showing the fore and aft cam location in the spherical head.

Referring in more detail to the drawings:

Fig. 1 shows a helicopter composed of a fuselage 62 with provision for passengers in the forward section. A power control shaft 7 is shown extending from the floor 61 to a sphere 13 located at and attached to the upper section of the fuselage carrying a number of blades 40. Located below the floor 61 and under the passenger compartment is the control linkage from the stick to the control shafts 21 and 23.

The control stick 1 is made to pivot laterally about pin 49 (Fig. 3) thereby supplying force on push-pull rod 43 through pin 41 and rod end 42. The other end of push-pull rod 43 (Fig. 3) is attached to bellcrank 47 through a rotating rod end 48 (Fig. 4) and causes bellcrank 47 to rotate about a fixed axis 63. Force is thereby generated in link 46 which causes bellcrank 45 (Fig. 2) to rotate about fixed point 64. The end of link 46 is fitted with a self aligning bearing (Fig. 12) where it attaches to bellcrank 45. Push-pull rod 3 (Fig. 2) is thus caused to move on its longitudinal axis rotating control arm 5.

Welded bracket 50 (Fig. 3) is attached to torque tube 44. Push-pull rod 4 (Fig. 2) is attached to bracket 50 and control arm 6. Fore and aft movement of stick 1 causes push pull rod 4 to move on its longitudinal axis.

Torque tube 44 is supported by and rotates in bearings 66 and 65 which are with suitable structure, attached to the fuselage structure.

Control arm 5 (Fig. 5) is rigidly attached to shaft 23 and rotates with it. Shaft 23 extends through bearing and bearing support 24, bearing 58 and into the control sphere 14 where it is rigidly attached to cam 28.

Cam 28 is so designed (Fig. 8) that when it is rotated by shaft 23 and control arm 5 it will move extendable means, such as linkage 28 (Fig. 5), in such a manner as to cause the upper portion of sphere 14 to tilt either to the right or to the left or if in neutral to hold sphere 14 in a position so as to place blade yoke 15 in a plane perpendicular to shaft 23. It will be noted from Fig. 5 and Fig. 8 that the upper portion of sphere 14 has an annular groove in which blade yoke 15 is retained by bearings 18 and 19.

Control arm 6 (Fig. 5) is rigidly attached to shaft 21 and rotates with it. Shaft 21 rides in bearing and bearing block 22. Shaft 21 passes through sleeve bearings 60 and 57 and into sphere 14 where it is rigidly attached to cam 27. Cam 27 (Fig. 8) is so designed that when it is rotated by shaft 21 and control arm 6 it will actuate extendable means, such as linkage 56 (Fig. 13), thereby causing the upper portion of sphere 14 to be tilted either forward or aft relative to shaft 21. It is apparent from the foregoing description that an infinite number of planes can be established in an infinite number of positions around the center line of the control shafts. It is then apparent that the lift vector of the blades can be placed in any desired position.

Shaft 25 (Fig. 5) prevents the rotation of sphere 14 by being splined into retaining plate 29 which is bolted to floor 61. Shaft 25 is splined into lower portion of sphere 14. The upper portion of sphere 14 is retained from rotation by linkages 26 and 56. It is obvious that sphere 14 does not rotate. Sphere 14 has a section removed below its center line. This allows the upper portion of sphere 14 to tilt inside sphere 13 as dictated by cams 27 and 28 and linkages 26 and 56. The lower portion of sphere 14 does not rotate or tilt. The upper portion of sphere 14 is retained by bearings 19 (Fig. 11).

Power is supplied to the blades 40 through a fluid coupling and a gear box. This power is transmitted to shaft 7 through bevel gears 8 and 9 (Fig. 5). Bevel gear 9 is rigidly attached to power shaft 7. Shaft 7 is splined into sphere 13 in such a manner that they have the same rotational speed. Blade yoke 15 is caused to rotate with the same speed as sphere 13 through the force applied by flange 16 on bearing 17 (Fig. 10). Bearing 17 is attached to blade yoke 15 (Fig. 8), which may be regarded as a retaining means for the blades. Blade yokes 15 are arranged to travel vertically through slots in the sphere 13, such as slot 80, in response to the expansion and contraction of linkages 26 and 56.

The lifting force of the blades 40 (Fig. 1) is dumped into upper portion of sphere 14 by bearing 18 (Fig. 5 and Fig. 9) and then into sphere 13. Nut 10 is threaded to the flange of sphere 13 thereby causing the load of the helicopter and the payload to be unloaded into thrust bearing 11. Thrust bearing 11 discharges the load into support 12 and then into the structure of the fuselage (Fig. 1).

Thrust bearing 20 receives the load of the blades and the spheres when the helicopter is on the ground.

Bearings 59 and 67 hold the control mechanism concentric with power shaft 7.

Blades 40 (Fig. 6) are attached to blade yoke 15 in such a manner that the centrifugal force of rotating blades 40 is dumped into thrust bearing 52 and bearing support 53 and then into blade yoke 15. Blade 40 is free to rotate about blade yoke 15 on bearings 52 and 54. The load of bearing 54, a self aligning bearing, is unloaded into blade beam 55.

Pilot airfoil 30 supplies the controlling moment, which is the lift force of pilot airfoil 30 times the distance to point A, through structure 31 to regulate the angle of attack of blade 40. Pilot airfoil 30 is controlled by mass 34 which because of its mass tends to move in a direction opposite to point A and is controlled by the rotational speed of point A. Point A rotates with the same speed as blade yoke 15. The rotation of mass 34 causes bellcrank 33 to rotate shaft 35. Bellcranks 32 and 33 are rigidly attached to shaft 35. As mass 34 is rotated around shaft 35, bellcrank 32 actuates cables 39 which rotate pilot airfoil 30 about its shaft 68, thereby increasing or decreasing its angle of attack and therefore its lift.

Blade 40 is caused to tend to remain in a fixed position by a double acting spring bungee 37. Double acting spring bungee 37 is composed of a housing 70, pistons 69 and 73, pin 75, spring 71, shaft 74 and cap 72. Shaft 74 is so designed that it can move through piston 73 in one direction only. The moving of shaft 74 in the opposite direction will compress spring 71. Shaft 74 can move through piston 69 in one direction only. Pin 75 causes shaft 74, through piston 69, to compress spring 71 when moved in the opposite direction. Cap 72 retains pistons 69 and 73 and spring 71. Double acting spring bungee 37 is attached to blade 40 by fitting 38 and to blade yoke 15 by bellcrank 36 which is bolted to blade yoke 15.

An added safety feature exists in this automatic control mechanism. In the event of power failure point A will decrease in velocity. Mass 34, due to forces exerted and to spring 51, will decrease the angle of attack of pilot airfoil 30 which through structure 31 will decrease the angle on blade 40. When sufficient blade rotational speed has been built up mass 34 will increase the angle of attack of pilot airfoil 30 which through structure 31 will cause blade 40 to again assume a positive angle of attack. This cycle will continue until the helicopter reaches the ground. The throttle 2 will control the revolutions per minute of the engine and through the gear box will control the speed of the counter-torque propeller and thereby its thrust. As stated above, the rotor blade pitch control will be controlled indirectly by the revolutions per minute of the engine.

What I claim and desire to secure by Letters Patent is:

1. An aircraft including a fuselage comprising, a hollow sphere rotatably secured to the fuselage, a plurality of rotor blades projecting outward through the sphere and rotatable by the hollow sphere, drive mechanism supported on the fuselage for rotating the hollow sphere, mechanical linkage enclosed by the hollow sphere positioning the blades vertically respective to the fuselage, and control means engageable with the linkage and supported on the fuselage within the hollow sphere selectively positionable to adjust the mechanical linkage whereby the lift vector of the blades is placed in a desired position.

2. The invention as defined in claim 1 wherein the mechanical linkage comprises at least four sets of expandable links including a single elbow joint in each set, and the control means being engageable with the elbow of each set to selectively expand and retract certain sets of mechanical linkages.

3. The invention as defined in claim 2 wherein the control means includes a rotatable control shaft carried by the fuselage and cam means secured to the shaft within the hollow sphere engageable with the elbow of each set for causing the linkages to expand and retract selectively.

4. An aircraft including a fuselage comprising, an outer sphere rotatably secured to the fuselage substantially in the middle thereof, an inner sphere located within the outer sphere having a fixed portion secured to the fuselage and a movable portion, expandable means coupling the fixed portion and the movable portion, a plurality of rotor blades carried by the movable portion of the inner sphere projecting through the outer sphere, a plurality of vertical slots provided in the outer sphere through which the rotor blades pass, a power source connected to the outer sphere for rotating the outer sphere respective to the fuselage, flange means projecting from the periphery of the outer sphere engageable with the plurality of rotor blades for imparting the rotary movement of the outer sphere to the blades, and control means independent of the power source supported on the fuselage and projecting into the interior of the inner sphere and engageable with the expandable means for selectively tilting the movable portion of the inner sphere respective to the fixed portion whereby the lift vector of the blades is placed in a desired position.

5. An aircraft including a fuselage comprising, an outer sphere rotatably secured to the fuselage substantially in the middle thereof, an inner sphere located within the outer sphere having a fixed portion secured to the fuselage and a movable portion, mechanical linkage coupling the fixed portion and the movable portion, a plurality of rotor blades carried by the movable portion of the inner sphere projecting through the outer sphere, a power source supported on the fuselage and connected to the outer sphere for rotating the outer sphere respective to the fuselage, flange means projecting from the periphery of the outer sphere engageable with the plurality of rotor blades for imparting the rotary movement of the outer sphere to the blades, and control means independent of the power source supported on the fuselage and projecting into the interior of the inner sphere and engageable with the mechanical linkages for selectively tilting the movable portion of the inner sphere respective to the fixed portion whereby the lift vector of the blades is placed in a desired position.

6. An aircraft including a fuselage comprising, a hollow spherical head rotatably carried by the fuselage, rotor blades projecting from the hollow spherical head and arranged in fixed spaced relationship to each other for elevating and driving the aircraft, a power supply supported on the fuselage for driving the hollow spherical head and rotor blades, a control sphere disposed within the hollow spherical head carrying the rotor blades within the spherical head, mechanical linkage movably fixing the control sphere to the fuselage, and manually actuated cam means engageable with the linkage for tilting the control sphere so that the lift vector of the blades is placed in a desired position.

7. The invention as defined in claim 6 including a pair of concentric control shafts rotatably supported on the fuselage carrying the cam means, and control stick means pivotally carried on the fuselage and coupled to the shafts so that the control sphere tilts in response to movement of the control stick means via rotation of the shafts.

8. An aircraft including a fuselage comprising, a hollow sphere rotatably secured to the fuselage, a plurality of rotor blades projecting outwardly from the sphere and rotatable by the hollow sphere, drive mechanism supported on the fuselage for rotating the hollow sphere, an inner sphere enclosed by the hollow sphere having a movable upper portion carrying the blades and a lower portion fixed to the fuselage, four sets of expandable mechanical linkages connecting the lower portion of the inner sphere to the upper portion and cooperating to support the upper portion whereby two sets of linkages move the upper portion about one axis of the inner sphere and the other two sets of linkages move the upper portion about an axis substantially at right angles to the first mentioned axis, a pair of rotatable control shafts supported on the fuselage extending through the lower portion of the inner sphere into the hollow sphere, eccentric cam means secured to each control shaft within the hollow sphere engageable with the sets of linkages for selectively tilting the upper portion of the inner sphere relative to the lower portion to achieve a particular lift vector of the rotor blades.

9. The invention as defined in claim 8 wherein the outer sphere is provided with a plurality of vertical slots through which the rotor blades pass to the exterior of the sphere.

10. An aircraft including a fuselage comprising, a hollow sphere rotatably secured to the fuselage, a plurality of rotor blades projecting outwardly from the sphere and rotatably by the hollow sphere, drive mechanism supported on the fuselage for rotating the hollow sphere, an inner sphere enclosed by the hollow sphere having a movable upper portion carrying to the blades and a lower portion fixed to the fuselage, four sets of expandable mechanical linkages connecting the lower portion of the inner sphere to the upper portion and cooperating to support the upper portion whereby two sets of linkages move the upper portion about one axis of the inner sphere and the other two sets of linkages move the upper portion about an axis substantially at right angles to the first mentioned axis, a pair of rotatable control shafts supported on the fuselage extending through the lower portion of the inner sphere into the hollow sphere, an eccentric cam disposed on opposite sides of each control shaft within the hollow sphere and secured to each shaft, and the cams engageable with the sets of linkages for selectively tilting the movable upper portion of the inner sphere about the axis of the inner sphere to achieve a particular lift vector of the rotor blades.

11. An aircraft including a fuselage comprising, a hollow sphere rotatably secured to the fuselage, a plurality of rotor blades projecting through the sphere and rotatable by the hollow sphere, drive mechanism supported on the fuselage for rotating the hollow sphere, extendable means enclosed by the hollow sphere for adjustably positioning the blades vertically respective to the fuselage; the extendable means including, at least four sets of extendable links including a single elbow joint in each set; and control means supported by the fuselage within the hollow sphere and engageable with the elbow of each set of links to selectively advance and retract the extendable means whereby the lift vector of the blades is placed in a desired position.

References Cited in the file of this patent

UNITED STATES PATENTS

| | | |
|---|---|---|
| 2,110,638 | Synnestvedt | Mar. 8, 1938 |
| 2,216,164 | Schairer | Oct. 1, 1940 |
| 2,273,051 | Larsen | Feb. 17, 1942 |
| 2,625,997 | Doak | Jan. 20, 1953 |
| 2,658,575 | Stone | Nov. 10, 1953 |
| 2,761,521 | Pullin | Sept. 4, 1956 |